(12) United States Patent
Kiehl

(10) Patent No.: US 7,127,816 B2
(45) Date of Patent: Oct. 31, 2006

(54) METHOD OF PERMANENTLY JOINING FIRST AND SECOND METALLIC COMPONENTS

(75) Inventor: Mark W. Kiehl, Bernville, PA (US)

(73) Assignee: Dana Corporation, Toledo, OH (US)

( * ) Notice: Subject to any disclaimer, the term of this patent is extended or adjusted under 35 U.S.C. 154(b) by 181 days.

(21) Appl. No.: 10/793,336

(22) Filed: Mar. 4, 2004

(65) Prior Publication Data

US 2005/0193545 A1    Sep. 8, 2005

(51) Int. Cl.
  B23P 11/00 (2006.01)
  B23P 17/00 (2006.01)
  B21D 26/14 (2006.01)
  B21D 39/00 (2006.01)
  B21D 53/88 (2006.01)

(52) U.S. Cl. .................. 29/897.2; 29/419.2; 29/505; 29/508; 29/509; 403/274; 403/282; 403/285; 72/56; 219/617

(58) Field of Classification Search .............. 29/897.2, 29/419.2, 421.1, 505, 507, 508, 509, 515, 29/516, 517, 521; 403/274, 282, 285; 72/56; 219/607, 611, 617, 643, 644, 121.13, 121.14
See application file for complete search history.

(56) References Cited

U.S. PATENT DOCUMENTS

| | | | |
|---|---|---|---|
| 3,283,402 A * | 11/1966 | Larson | 29/512 |
| 4,188,800 A * | 2/1980 | Fujita et al. | 464/179 |
| 4,205,426 A * | 6/1980 | Stillman, Jr. | 29/512 |
| 4,211,381 A * | 7/1980 | Heard | 248/230.8 |
| 4,298,155 A | 11/1981 | Palovcik | |
| 4,930,204 A | 6/1990 | Schurter | |
| 5,056,704 A | 10/1991 | Martin et al. | |
| 5,228,181 A | 7/1993 | Ingle | |
| 5,317,798 A | 6/1994 | Thompson et al. | |
| 5,324,133 A * | 6/1994 | Kreis et al. | 403/270 |
| 5,458,393 A | 10/1995 | Benedyk | |
| 5,498,091 A * | 3/1996 | Chan | 403/3 |
| 5,824,998 A | 10/1998 | Livshiz et al. | |
| 5,865,362 A * | 2/1999 | Behrmann et al. | 228/114.5 |
| 5,937,496 A | 8/1999 | Benoit et al. | |
| 5,966,813 A | 10/1999 | Durand | |
| 6,010,182 A | 1/2000 | Townsend | |
| 6,148,581 A * | 11/2000 | Separautzki | 52/653.2 |
| 6,241,310 B1 | 6/2001 | Patelczyk | |
| 6,255,631 B1 * | 7/2001 | Kichline et al. | 219/617 |
| 6,308,412 B1 * | 10/2001 | Christofaro et al. | 29/897.2 |

(Continued)

Primary Examiner—Jermie E. Cozart
(74) Attorney, Agent, or Firm—MacMillan, Sobanski & Todd, LLC

(57) ABSTRACT

A pair of metallic components, such as a pair of metallic structural components for a vehicular body and frame assembly, are permanently joined using a magnetic pulse welding process. Initially, a first metallic component is provided having a first aperture that is formed through a first side and a second aperture having a hollow cylindrical flange portion that is formed through a second side. A second metallic component is provided having a surface that extends at an angle relative to the flange portion. The angled surface may be provided in the form of either an enlarged region or a reduced region on the second metallic component. The first and second metallic components are arranged such that the flange portion of the first metallic component overlaps the surface of the second metallic component. A magnetic pulse welding process is performed to cause the flange portion of the first metallic component and the angled surface of the second metallic component to engage one another and become permanently joined.

15 Claims, 5 Drawing Sheets

U.S. PATENT DOCUMENTS

| | | |
|---|---|---|
| 6,353,991 B1 * | 3/2002 | Dehghan-Manshadi et al. .......................... 29/516 |
| 6,375,381 B1 * | 4/2002 | Ruschke et al. ............ 403/282 |
| 6,408,515 B1 * | 6/2002 | Durand ..................... 29/897.2 |
| 6,523,876 B1 * | 2/2003 | Durand ..................... 296/35.1 |
| 6,812,439 B1 * | 11/2004 | Durand ..................... 219/617 |
| 6,813,818 B1 * | 11/2004 | Schmidt .................... 29/419.2 |

* cited by examiner

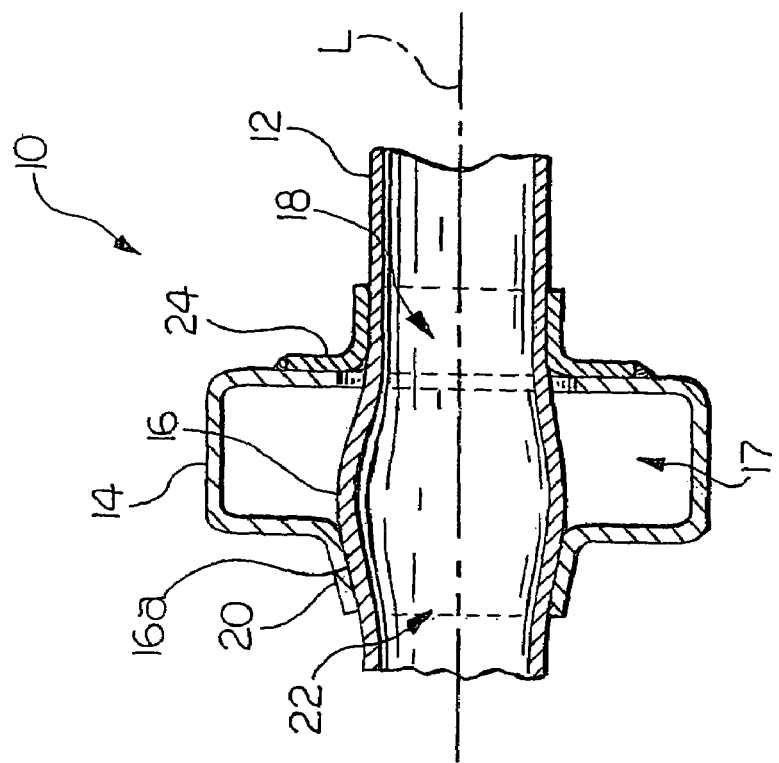
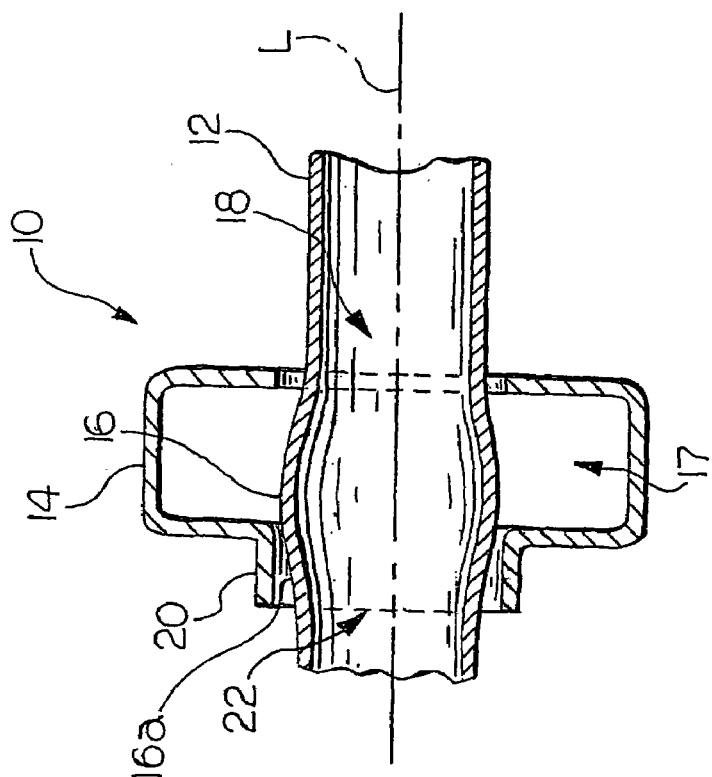

METHOD OF PERMANENTLY JOINING FIRST AND SECOND METALLIC COMPONENTS

BACKGROUND OF THE INVENTION

This invention relates in general to methods for forming joints between metallic components, such as a joint between a pair of metallic structural components for use in a vehicular body and frame assembly. In particular, this invention relates to an improved method for permanently joining such a pair of metallic structural components using magnetic pulse welding techniques.

Many land vehicles in common use, such as automobiles, vans, and trucks, include a body and frame assembly that is supported upon a plurality of ground-engaging wheels by a resilient suspension system. The structures of known body and frame assemblies can be divided into two general categories, namely, separate and unitized. In a typical separate body and frame assembly, the structural components of the body portion and the frame portion of the vehicle are separate and independent from one another. When assembled, the frame portion of the assembly is resiliently supported upon the vehicle wheels by the suspension system and serves as a platform upon which the body portion of the assembly and other components of the vehicle can be mounted. Separate body and frame assemblies of this general type are found in most older vehicles, but remain in common use today for many relatively large or specialized use modern vehicles, such as large vans, sport utility vehicles, and trucks. In a typical unitized body and frame assembly, the structural components of the body portion and the frame portion are combined into an integral unit that is resiliently supported upon the vehicle wheels by the suspension system. Unitized body and frame assemblies of this general type are found in many relatively small modern vehicles, such as automobiles and minivans.

Traditionally, the structural components of such vehicular body and frame assemblies have been formed exclusively from steel alloys. Steel alloys are relatively high strength materials, and it is relatively easy to permanently join steel alloy structural components using traditional welding techniques, such as gas metal arc welding. Unfortunately, steel alloys are also relatively heavy materials. Thus, there has been a movement to form some or all of the structural components of these vehicular body and frame assemblies from lighter weight materials, such as aluminum alloys. Such aluminum alloys and other materials are both strong and lightweight and, therefore, are usually regarded as desirable substitutes for steel alloys in vehicular body and frame assemblies. However, it has been found to be relatively difficult to permanently join such structural components using traditional welding techniques.

Magnetic pulse welding is a well known process that can be used to permanently join two metallic components, such as a pair of metallic structural components for a vehicular body and frame assembly. Magnetic pulse welding is particularly advantageous because it can readily and permanently join components that are formed from different metallic materials. Typically, a magnetic pulse welding process is performed by initially disposing the end portions of first and second metallic components in a concentric, axially overlapping relationship. An electromagnetic inductor or coil is provided for generating an intense magnetic field either within or about the axially overlapping portions of the first and second metallic components. When this occurs, a large pressure is exerted on one of the first and second metallic components, causing it to move toward the other of the first and second metallic components at a high velocity. If the electromagnetic inductor is disposed about the exterior of the two metallic components, then the outer metallic component is deformed inwardly into engagement with the inner metallic component. If, on the other hand, the electromagnetic inductor is disposed within the interior of the two metallic components, then the inner metallic component is deformed outwardly into engagement with the outer metallic component. In either event, the high velocity impact of the first and second metallic components cause them to become permanently joined or welded.

In order to facilitate the performance of the magnetic pulse welding process, it is usually desirable to orient the overlapping end portions of first and second metallic components at a predetermined angle relative to one another (i.e., not parallel to one another). This predetermined angle of orientation, as well as other parameters of the magnetic pulse welding process, will vary with the sizes, shapes, materials, and other characteristics of the two metallic components to be joined together. Thus, it would be desirable to provide an improved method for permanently joining a pair of metallic components, such as a pair of metallic structural components for use in a vehicular body and frame assembly, that orients the overlapping end portions of the first and second metallic components at this predetermined angle relative to one another to facilitate the performance of the magnetic pulse welding process.

SUMMARY OF THE INVENTION

This invention relates to an improved method for permanently joining a pair of metallic components, such as a pair of metallic structural components for use in a vehicular body and frame assembly, that orients the overlapping end portions of the first and second metallic components at a predetermined angle relative to one another to facilitate the performance of the magnetic pulse welding process. Initially, a first metallic component is provided having a first aperture that is formed through a first side and a second aperture having a hollow cylindrical flange portion that is formed through a second side. A second metallic component is provided having a surface that extends at an angle relative to the flange portion. The angled surface may be provided in the form of either an enlarged region or a reduced region on the second metallic component. The first and second metallic components are arranged such that the flange portion of the first metallic component overlaps the surface of the second metallic component. A magnetic pulse welding process is performed to cause the flange portion of the first metallic component and the angled surface of the second metallic component to engage one another and become permanently joined.

Various objects and advantages of this invention will become apparent to those skilled in the art from the following detailed description of the preferred embodiments, when read in light of the accompanying drawings.

BRIEF DESCRIPTION OF THE DRAWINGS

FIG. 3 is a sectional elevational view of the first and second metallic components illustrated in FIG. 2 shown assembled.

FIG. 4 is a sectional elevational view of the first and second metallic components illustrated in FIG. 3 after being permanently joined together.

DETAILED DESCRIPTION OF THE PREFERRED EMBODIMENTS

Figure 1:
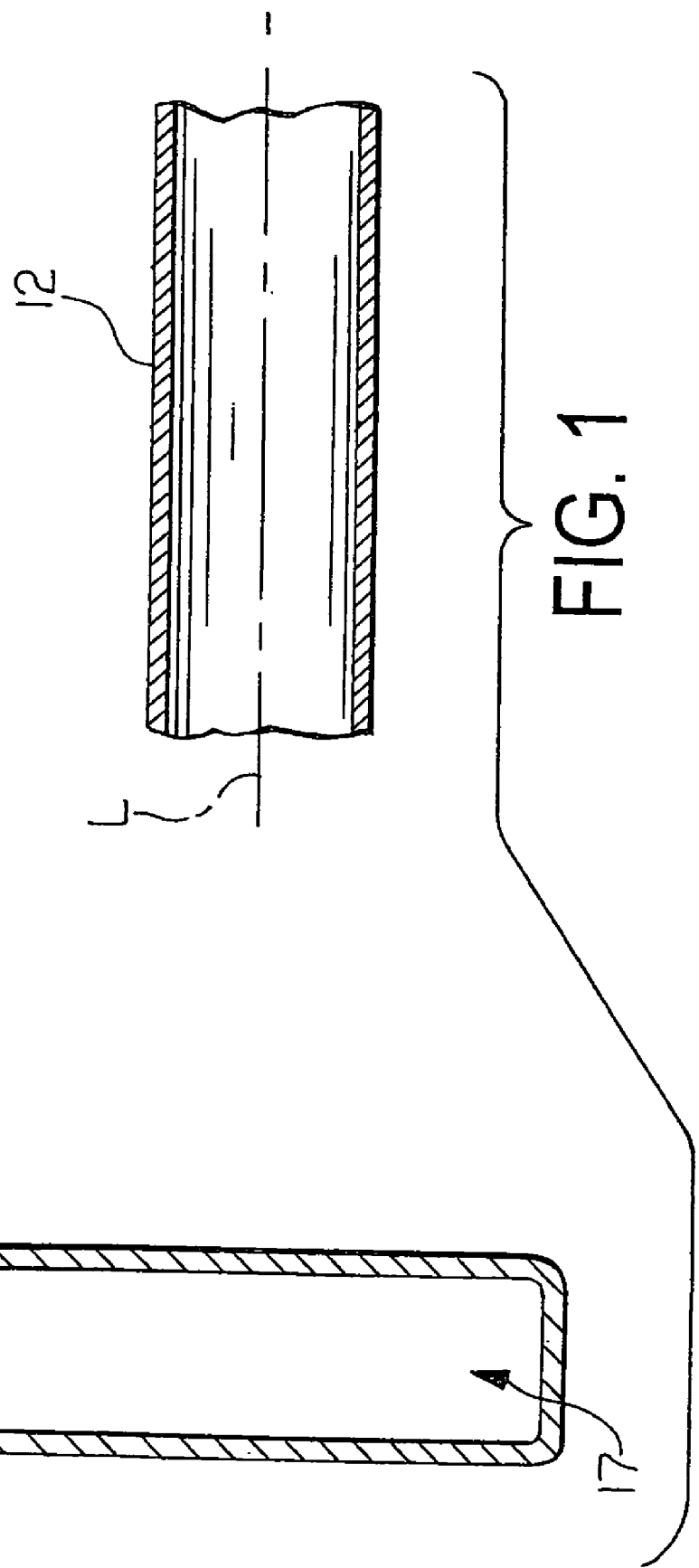
FIG. 1 is a sectional elevational view of first and second metallic components prior to being permanently joined in accordance with the method of this invention.

Referring now to the drawings, there is illustrated in FIG. 1 first and second metallic components 12 and 14, respectively, that are shown prior to being permanently joined in accordance with the method of this invention. The first and second metallic components 12 and 14 can, for example, be embodied as a cross member 12 and a side rail 14 or other metallic structural components for use in a vehicular body and frame assembly. Such vehicular body and frame assemblies are, of themselves, conventional in the art, and the illustrated cross member 12 and side rail 14 are intended merely to illustrate one environment in which this invention may be used. Thus, the scope of this invention is not intended to be limited for use with vehicular body and frame assemblies. On the contrary, as will become apparent below, this invention may be used in any desired environment for the purposes described below.

The cross member 12 can be embodied as an elongated structural component that is formed from a metallic material, such as steel or aluminum, for example. In the illustrated embodiment, the cross member 12 is a closed channel structural component (i.e., a component having a continuous cross sectional shape, such as tubular or box-shaped, for example) having a generally circular cross sectional shape, defining a longitudinal axis L. However, the cross member 12 may be an open channel structural component (i.e., a component having a non-continuous cross sectional shape, such as U-shaped or C-shaped, for example) and may have any desired cross sectional shape. The cross member 12 can be deformed to a desired shape, such as by using hydroforming or other processes, if desired.

The side rail 14 can also be embodied as an elongated structural component that is formed from a metallic material, such as steel or aluminum, for example. In the illustrated embodiment, the side rail 14 is also a closed channel structural component having a generally rectangular cross sectional shape, defining an interior 17. However, the side rail 14 can be an open channel structural component and may have any desired cross sectional shape. The side rail 14 can be deformed to a desired shape, such as by using hydroforming or other processes, if desired. The cross member 12 and the side rail 14 can be formed from the same or different metallic materials, as desired.

Figure 2:
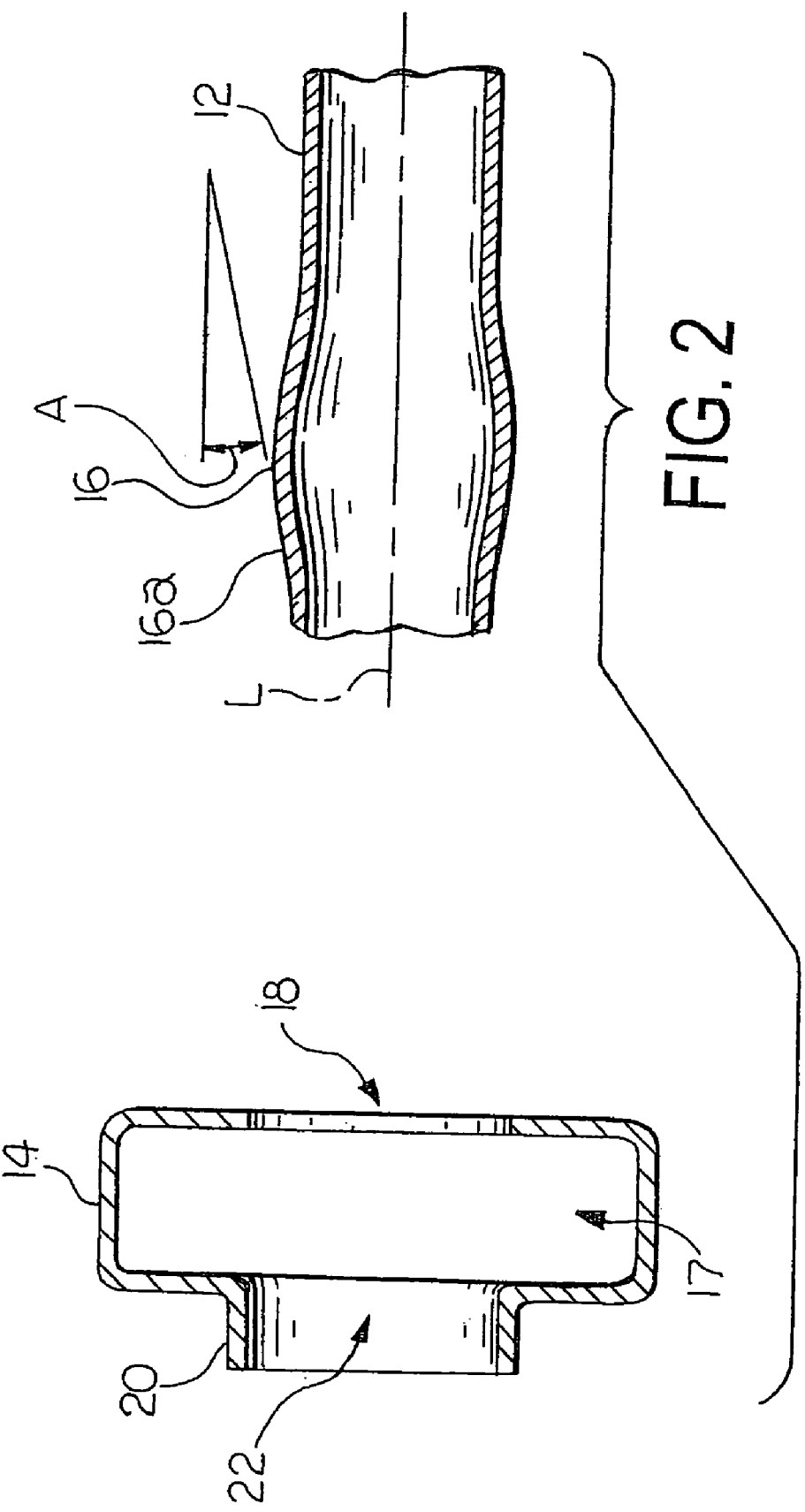
FIG. 2 is a sectional elevational view of the first and second metallic components illustrated in FIG. 1 shown after an initial step of a first embodiment of the method of this invention has been performed.

A first embodiment of the method of this invention shown in FIGS. 2 through 6. As shown in FIG. 2, first and second apertures 18 and 22 are initially formed through portions of the side rail 14. In the illustrated embodiment, the first aperture 18 is formed through a first side wall of the side rail 14, while the second aperture 22 is formed through a second side wall of the side rail 14. In the illustrated embodiment, the first and second side walls of the side rail 14 are opposite to one another, although such is not necessary. The first and second apertures 18 and 22 are preferably co-axially aligned with one another, although again such is not necessary. The first aperture 18 is preferably merely a through hole that can be formed through the first side wall of the side rail 14 in any desired manner, such as by cutting, drilling, perforating, and the like. The second aperture 22 can also be formed in any desired manner. However, the second aperture 22 is preferably formed in such a manner as to provide an annular flange portion 20 thereabout, as shown in FIG. 2. For example, the second aperture 22 and the flange portion 20 can be formed using an apparatus that is available from T-DRILL Industries Inc. of Norcross, Ga. However, the flange portion 20 can be formed using any other desired process or apparatus. Preferably, the flange portion 20 is generally hollow and cylindrical in shape and extends generally co-axially outwardly from the interior 17 of the side rail 14 relative to the co-axially aligned first and second apertures 18 and 22, respectively. However, the flange portion 20 may be formed having any desired shape and need not extend continuously about the second aperture 22. Also, the flange portion 20 may, if desired, extend inwardly within the interior 17 of the side rail 14.

As also shown in FIG. 2, the illustrated cross member 12 has an enlarged region 16 provided therein. The illustrated enlarged region 16 is defined by a pair of opposed, generally frusto-conical surfaces that gradually taper outwardly, then inwardly from the adjacent portions of the cross member 12. However, the enlarged region 16 may be formed having any desired shape or combination of shapes. Furthermore, although illustrated as having a circumferentially continuous annular shape, it will be appreciated that the enlarged region 16 can be formed as an annular array of discrete enlarged regions, or alternatively as a single enlarged region that does not extend completely about the circumference of the cross member 12. The enlarged region 16 can be formed in the cross member 12 in any desired manner, such as by mechanical, hydraulic, or magnetic pulse forming process, for example. An outer surface portion 16a is defined on the enlarged region 16. This outer surface portion 16a extends at an angle A relative to the longitudinal axis L of the cross member 12 and, thus, to the outer surface of the cross member 12. The angle A can be set as desired, as will be explained further below. Preferably, however, the angle A is within the range of from about two degrees to about thirty degrees. A more preferred range is from about five degrees to about fifteen degrees, and a most preferred range is from about seven degrees to about ten degrees.

Next, the cross member 12 and the rail 14 are assembled as shown in FIG. 3 to form a joint 10 therebetween. To accomplish this, the cross member 12 is inserted through the first and second apertures 18 and 22 such that the outer surface portion 16a of the enlarged region 16 is disposed co-axially within the flange portion 20. To facilitate this, the second aperture 18 may be formed having an inner diameter or other dimension that is larger than the outer diameter or other dimension defined by the enlarged region 16. As mentioned above, the flange portion 20 on the side rail 14 is generally hollow and cylindrical in shape and extends generally co-axially relative to the first and second apertures 18 and 22, respectively. Thus, when the cross member 12 is inserted through the first and second apertures 18 and 22, the outer surface portion 16a of the enlarged region 16 extends generally at the angle A relative to the inner surface of the flange portion 20. Although the invention is shown and described in terms of first forming the enlarged region 16, then inserting the cross member 12 within the side rail 14, it will be appreciated that the method of this invention can be performed by first inserting the undeformed cross member 12 within the side rail 14, then forming the enlarged region 16. In either event, the enlarged region 16 of the cross member 12 defines a tapered gap between the angled outer surface portion 16a and the inner cylindrical surface of the flange portion 20 of the side rail 14. The purpose for this tapered gap will be explained below.

Figure 6:
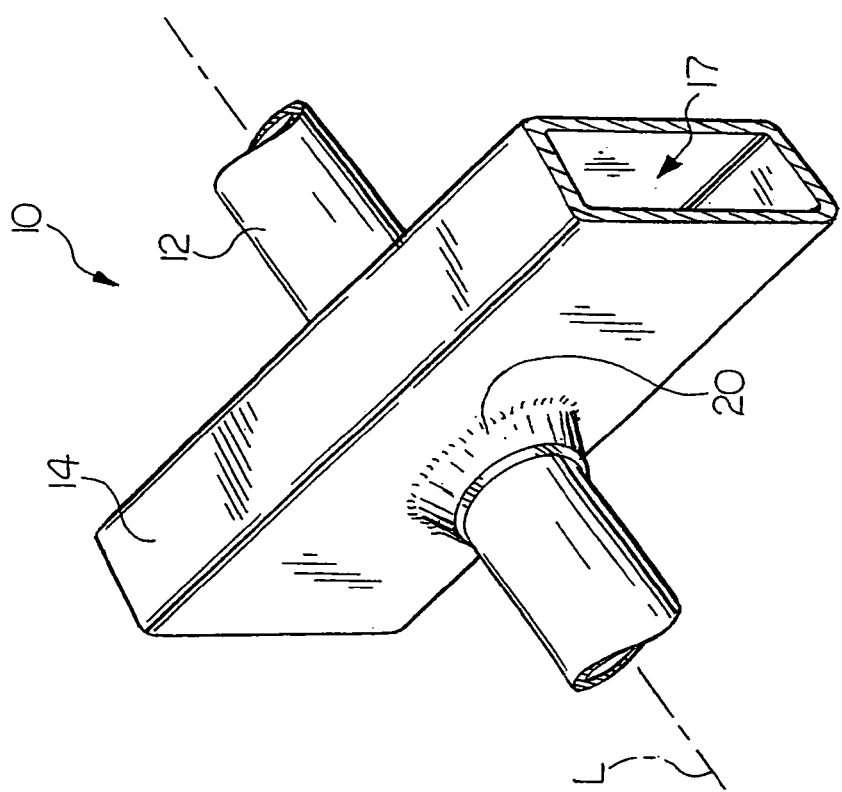
FIG. 6 is a left side perspective view of the first and second metallic components illustrated in FIG. 4.
Figure 5:
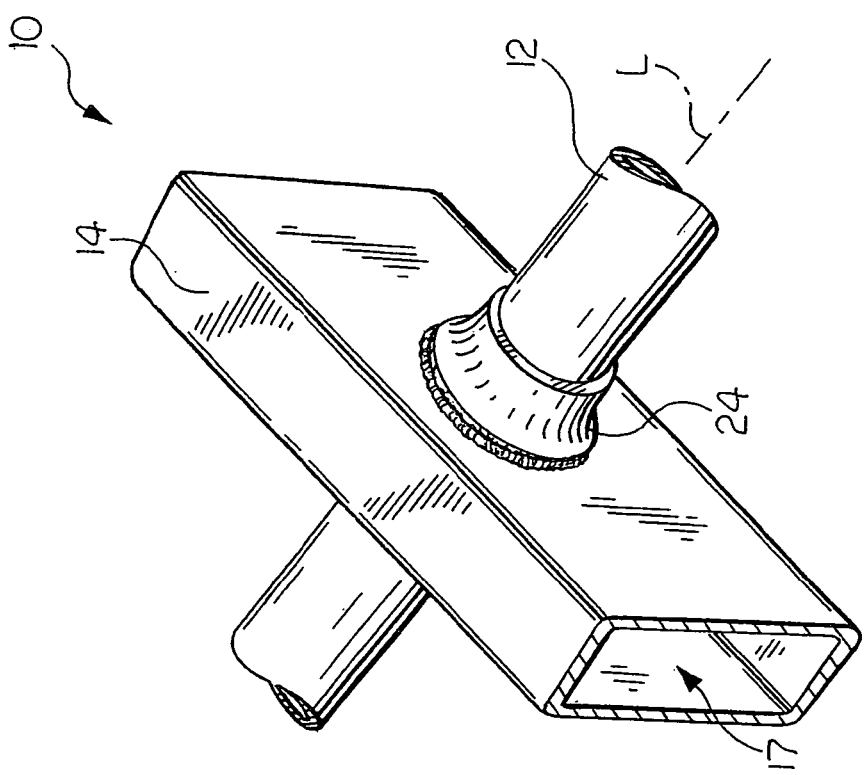
FIG. 5 is a right side perspective view of the first and second metallic components illustrated in FIG. 4.

The cross member 12 and the side rail 14 are then permanently joined together, as shown in FIGS. 4, 5, and 6. This is preferably accomplished using conventional magnetic pulse welding techniques. As discussed above, magnetic pulse welding is a well known process that can be used to permanently join two metallic components. Typically, a magnetic pulse welding process is performed by initially disposing the end portions of first and second metallic components in a concentric, axially overlapping relationship. An electromagnetic inductor or coil (not shown) is provided for generating an intense magnetic field either within or about the axially overlapping portions of the first and second metallic components. When this occurs, a large pressure is exerted on one of the first and second metallic components, causing it to move toward the other of the first and second metallic components at a high velocity. If the electromagnetic inductor is disposed about the exterior of the two metallic components, then the outer metallic component is deformed inwardly into engagement with the inner metallic component. If, on the other hand, the electromagnetic inductor is disposed within the interior of the two metallic components, then the inner metallic component is deformed outwardly into engagement with the outer metallic component. In either event, the high velocity impact of the first and second metallic components cause them to become permanently joined or welded together.

More specifically, magnetic pulse welding operates on the principle that when opposing magnetic fields are created about respective electrical conductors that are located adjacent to one another, a repulsive force is generated therebetween. For example, in the illustrated embodiment, a primary magnetic field is generated about the inductor by the passage of a relatively high energy electrical current therethrough. This primary magnetic field causes eddy currents to be induced in the flange portion 20 of the side rail 14. These eddy currents, in turn, cause a secondary magnetic field to be generated about the flange portion 20 of the side rail 14 that is opposed to the primary magnetic field generated about the inductor. Thus, a repulsive force is generated by the inductor against the flange portion 20, causing it to move away from the inductor at high velocity into engagement with the angled outer surface portion 16a of the enlarged region 16 of the cross member 12. As a result, the flange portion 20 of the side rail 14 is deformed into engagement with the angled outer surface portion 16a of the enlarged region 16 of the cross member 12. If the velocity at which the flange portion 20 engages the angled outer surface portion 16a and the angle A are properly selected, then the flange portion 20 will become permanently joined with the angled outer surface portion 16a, as shown in FIGS. 4, 5, and 6. Such velocity and angle, as well as other parameters of the magnetic pulse welding process, will vary with the sizes, shapes, materials, and other characteristics of the cross member 12 and the side rail 14.

If desired, a reinforcing collar 24 may be secured to portions of the cross member 12 and the side rail 14, as also shown in FIGS. 4, 5, and 6. To accomplish this, the reinforcing collar 24 can include a first portion that extends about a portion of the cross member 12 and a second portion that extends adjacent to the side rail 14 about the first aperture 18. The first and second portions of the reinforcing collar 24 can be secured to the cross member 12 and the side rail 14 in any desired manner or manners. However, in a preferred embodiment of the invention, both the cross member 12 and the reinforcing collar 24 are formed from a first metallic material (such as an aluminum alloy), while the side rail 14 is formed from a second metallic material (such as a steel alloy). In this instance, the first portion of the reinforcing collar 24 can be secured to the cross member 12 by magnetic pulse welding techniques.

To facilitate the magnetic pulse welding process, the first portion of the reinforcing collar 24 preferably extends at a predetermined angle relative to the outer surface of the cross member 12. Preferably, the reinforcing collar 24 is formed in such a manner that the first portion thereof extends at a predetermined angle relative to a portion of the outer surface of the cross member 12 that is parallel with the longitudinal axis L thereof. Alternatively, the first portion of the reinforcing collar 24 can extend parallel with the longitudinal axis L of the cross member 12, and the enlarged region 16 can extend a sufficient length of the cross member 12 such that a second angled outer surface portion (not shown) is disposed in an overlapping relationship with the first portion of the reinforcing collar 24, similar to the angular orientation of the inner surface of the flange portion 20 to the outer surface portion 16a of the cross member 12, as described above. In either case, an electromagnetic inductor or coil (not shown) can be used as described above to cause the first portion of the reinforcing collar 24 and the cross member 12 to become permanently joined or welded together. The second portion of the reinforcing collar 24 can be secured to the side rail 14 using conventional welding techniques, such as by gas metal arc welding and the like.

Figure 7:
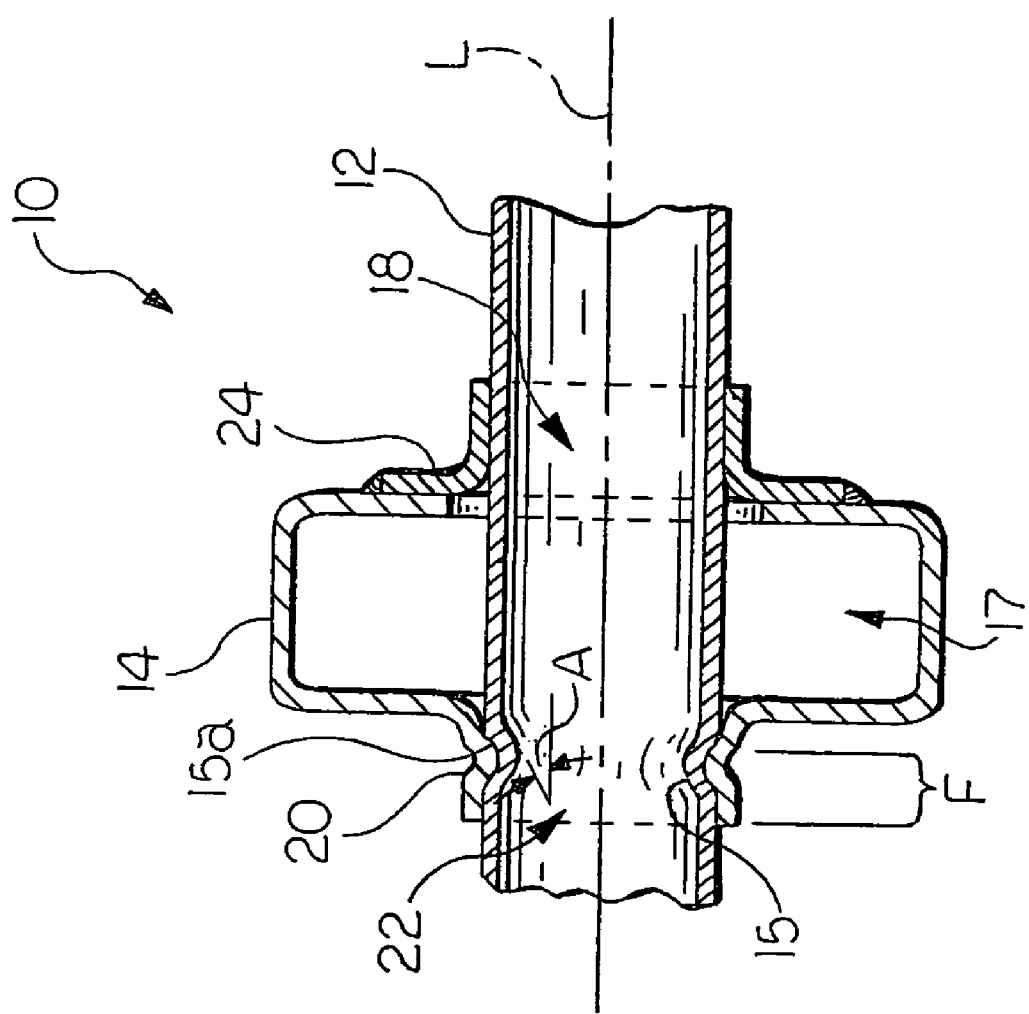
FIG. 7 is a sectional elevational view of the first and second metallic components illustrated in FIG. 3 after being permanently joined together in accordance with a second embodiment of the method of this invention.

FIG. 7 is a sectional elevational view of the cross member 12 and the side rail 14 illustrated in FIG. 3 after being permanently joined together in accordance with a second embodiment of the method of this invention. In this second embodiment of the invention, the enlarged region 16 is not formed in the cross member 12. Rather, in lieu of the enlarged region 16, the cross member 12 has a reduced region 15 formed therein. The illustrated reduced region 15 is defined by a pair of opposed, generally frusto-conical surfaces that gradually taper inwardly, then outwardly from the adjacent portions of the cross member 12. However, the reduced region 15 may be formed having any desired shape or combination of shapes. Furthermore, although illustrated as having a circumferentially continuous annular shape, it will be appreciated that the reduced region 15 can be formed as an annular array of discrete reduced regions, or alternatively as a single reduced region that does not extend completely about the circumference of the cross member 12. The reduced region 15 can be formed in the cross member 12 in any desired manner, such as by mechanical, hydraulic, or magnetic pulse forming process, for example. An outer surface portion is defined on the reduced region 15. This outer surface portion extends at an angle A relative to the longitudinal axis L of the cross member 12 and, thus, to the outer surface of the cross member 12. The angle A can be set as desired in the same manner as described above. The flange portion 20 of the side rail 14 can be permanently joined to the reduced region 15 of the cross member 12 using the same magnetic pulse welding technique described above.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A method for permanently joining a pair of metallic components comprising the steps of:
   (a) providing a first metallic component having an aperture formed therethrough and a cylindrical flange portion extending about the aperture;
   (b) providing a second metallic component with a bulged portion having a surface that extends at an angle relative to the cylindrical flange portion of the first metallic component;
   (c) disposing the first and second metallic components such that the cylindrical flange portion of the first metallic component overlaps the angled surface of the second metallic component; and
   (d) deforming the cylindrical flange portion of the first metallic component into engagement with the angled surface of the second metallic component so as to cause the cylindrical flange portion and angled surface to become permanently joined together.

2. The method defined in claim 1 wherein said step (a) is performed by providing a first metallic closed channel component, and wherein said step (b) is performed by providing a second metallic closed channel component.

3. The method defined in claim 1 wherein said step (a) is performed by providing a first metallic component having first and second apertures formed therethrough, and wherein the flange portion extends about the second aperture.

4. The method defined in claim 3 wherein said step (c) is performed by inserting the second metallic component through the first and second apertures.

5. The method defined in claim 4 including a further step (e) of providing a reinforcing collar that is secured to portions of the first and second metallic components.

6. The method defined in claim 5 wherein said step (e) is performed by providing a reinforcing collar about the first aperture.

7. The method defined in claim 5 wherein said step (e) is performed by providing the first metallic component from a first metallic material and by providing the second metallic component and the reinforcing collar from a second metallic material.

8. The method defined in claim 7 wherein said step (e) is performed by securing the reinforcing collar to the first metallic component by gas metal arc welding and by securing the reinforcing collar to the second metallic component by magnetic pulse welding.

9. The method defined in claim 1 wherein said step (b) is performed by providing a surface that extends at an angle of from about two degrees to about thirty degrees.

10. The method defined in claim 1 wherein said step (b) is performed by providing a surface that extends at an angle of from about five degrees to about fifteen degrees.

11. The method defined in claim 1 wherein said step (b) is performed by providing a surface that extends at an angle of from about seven degrees to about ten degrees.

12. The method defined in claim 1 wherein said step (d) is performed by magnetic pulse welding.

13. The method defined in claim 1 wherein said step (a) is performed by providing a first metallic component from a first metallic material, and wherein said step (b) is performed by providing a second metallic component from a second metallic material that is different from the first metallic material.

14. The method defined in claim 13 wherein said step (d) is performed by magnetic pulse welding.

15. A method for permanently joining a pair of metallic components comprising the steps of:
   (a) providing a first metallic component having first and second apertures formed therethrough and a cylindrical flange portion extending about the second aperture;
   (b) providing a second metallic component having a surface that extends at an angle relative to the cylindrical flange portion of the first metallic component;
   (c) inserting the second metallic component through the first and second apertures of the first metallic component such that the cylindrical flange portion of the first metallic component overlaps the angled surface of the second metallic component; and
   (d) deforming the cylindrical flange portion of the first metallic component into engagement with the angled surface of the second metallic component so as to cause the cylindrical flange portion and angled surface them to become permanently joined together.

* * * * *